United States Patent
Apostolopoulos et al.

(10) Patent No.: US 7,570,589 B1
(45) Date of Patent: Aug. 4, 2009

(54) MEDIA COMMUNICATION CONVERTING BURST LOSSES TO ISOLATED LOSSES

(75) Inventors: John Apostolopoulos, Palo Alto, CA (US); Yi Liang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1109 days.

(21) Appl. No.: 10/623,013

(22) Filed: Jul. 17, 2003

(51) Int. Cl.
*H04L 12/26* (2006.01)
*H04L 12/28* (2006.01)

(52) U.S. Cl. ....................... 370/235; 370/394
(58) Field of Classification Search ................. 370/235, 370/394
See application file for complete search history.

(56) References Cited

U.S. PATENT DOCUMENTS

| | | | |
|---|---|---|---|
| 5,767,907 A * | 6/1998 | Pearlstein | 375/240.25 |
| 6,247,150 B1 * | 6/2001 | Niemela | 714/701 |
| 6,252,905 B1 * | 6/2001 | Pokrinchak et al. | 375/240.14 |
| 6,289,054 B1 * | 9/2001 | Rhee | 375/240.27 |
| 6,665,271 B1 * | 12/2003 | Thomas et al. | 370/252 |
| 6,879,561 B1 * | 4/2005 | Zhang et al. | 370/235 |
| 6,959,048 B1 * | 10/2005 | Horneman et al. | 375/299 |
| 7,058,048 B2 * | 6/2006 | Clark | 370/356 |
| 7,106,752 B2 * | 9/2006 | Yamada | 370/412 |
| 7,164,860 B1 * | 1/2007 | Narvaez et al. | 398/58 |
| 2003/0133457 A1 * | 7/2003 | Ono et al. | 370/395.4 |
| 2004/0085909 A1 * | 5/2004 | Soliman | 370/252 |

\* cited by examiner

*Primary Examiner*—Andrew Lee

(57) ABSTRACT

Systems and methods for transmitting media packets are described. The methods include receiving media packets in one order and transmitting them in a different order that is selected according to loss characteristics of a downstream channel. The order selected for transmitting the media packets is one that results in reduced distortion with respect to the distortion predicted for the first order.

37 Claims, 9 Drawing Sheets

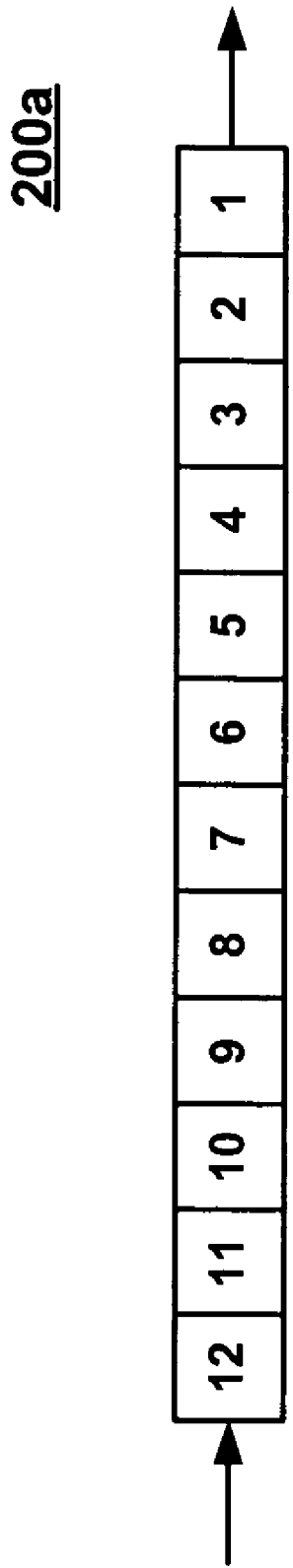
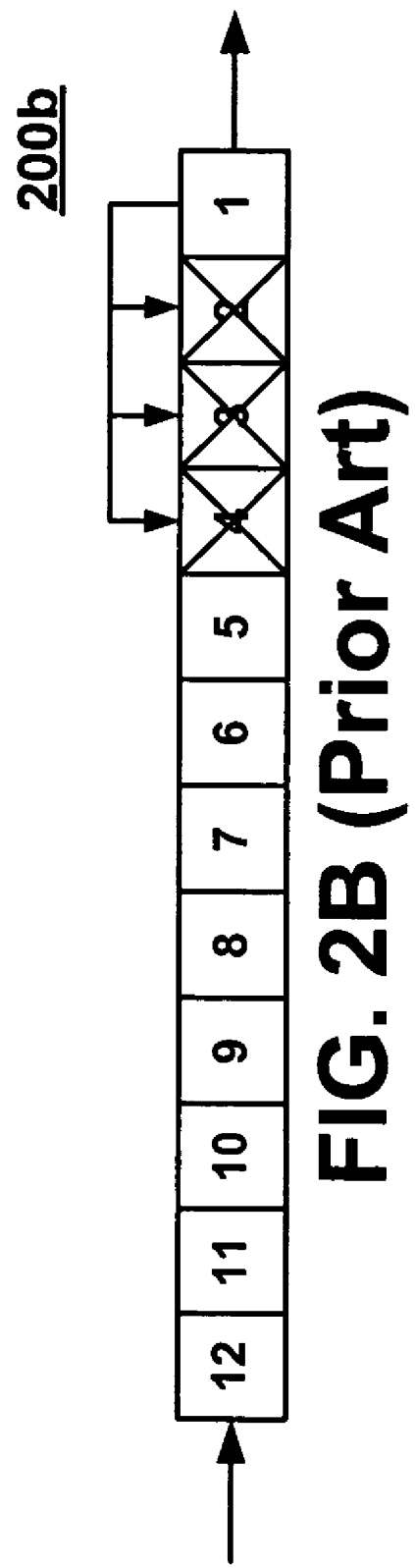
FIG. 2A (Prior Art)
FIG. 2B (Prior Art)

MEDIA COMMUNICATION CONVERTING BURST LOSSES TO ISOLATED LOSSES

TECHNICAL FIELD

Embodiments of the present invention relate to the field of media transmission. Specifically, embodiments of the present invention relate to streaming packets of media data.

BACKGROUND

Media communication over bit-rate-limited and error-prone channels, such as packet networks and wireless links, requires both high compression and high error resilience. Important applications within this context include streaming media over the Internet, and streaming wireless media to handheld devices with wireless local area networks (LANs) or with emerging Third Generation (3G) cellular systems. To achieve high compression, most current media compression systems, such as Motion Picture Experts Group (MPEG)-1/ 2/4 and H.261/3/L, employ motion-compensated prediction between frames to reduce the temporal redundancy, a spatial transform to reduce the spatial redundancy, and entropy encoding to produce the compressed bitstream. These algorithms provide significant compression; however, the compressed signal is much more vulnerable to packet losses when transmitted over error-prone channels such as the Internet. One problem that afflicts media compressed with these encoders is error propagation. Specifically, although the inter-frame prediction provides significant compression, the decoder depends on the reference frame used by the encoder in order to perform correct decoding. A channel error that, for example, results in loss of this reference frame can cause the reconstructed frame at the decoder to be distorted, which in turn can lead to significant error propagation to subsequent frames.

Prior Art FIG. 1 is a block diagram 100 showing an example of a typical system for transmitting media in accordance with conventional art. In the example shown, media data 110 enters an encoder/packetizer 120 where it is compressed, encoded and packetized for transmission. The packets that result can be stored in a storage medium 130 for later transmission over channel 150 as scheduled by scheduler 140.

Scheduler 140 of FIG. 1 schedules the packets for transmission at the appropriate time and transmits them sequentially, in numerical order, to a destined receiver/decoder 160. Receiver/decoder 160 decodes and decompresses the media and makes it available to a viewer over an appropriate viewer medium.

Prior Art FIG. 2A illustrates a stream of packets 200*a* as transmitted in the conventional art by scheduler 140 of FIG. 1. Each numbered square represents a packet and the numbers represent the sequence number of each packet. Thus, it is shown that the conventional stream of media packets is sequenced in numerical order.

One problem with the conventional art occurs when a number of consecutively transmitted packets are lost for one reason or another. This type of loss is known as a "burst" loss, or, in the plural as "bursty" losses. Prior Art FIG. 2B illustrates a conventional stream of packets 200*b* illustrating a burst loss (a loss of several sequential packets) containing frames 2, 3 and 4. Frame 1 is used to estimate the three missing frames. Since frames 3 and 4 are progressively further from frame 1, it follows that frame 1 provides a progressively worse estimate of the frames 3 and 4.

SUMMARY

Embodiments of the present invention pertain to systems and methods for transmitting media packets. The methods include receiving media packets in one order and transmitting them in a different order that is selected according to loss characteristics of a downstream channel. The order selected for transmitting the media packets is one that results in reduced distortion with respect to the distortion predicted for the first order.

BRIEF DESCRIPTION OF THE DRAWINGS

Prior Art

Prior Art FIG. 2A illustrates a stream of packets as transmitted in the conventional art.

Prior Art FIG. 2B illustrates a conventional stream of packets illustrating a burst loss.

DETAILED DESCRIPTION

Reference will now be made in detail to embodiments of the invention, examples of which are illustrated in the accompanying drawings. While the invention will be described in conjunction with the embodiments, it will be understood that they are not intended to limit the invention to these embodiments. On the contrary, the invention is intended to cover alternatives, modifications, and equivalents, which can be included within the spirit and scope of the invention as defined by the appended claims. Furthermore, in the following detailed description, numerous specific details are set forth in order to provide a thorough understanding of the present invention. In other instances, well known methods, procedures, and components have not been described in detail so as not to unnecessarily obscure aspects of the present invention.

Embodiments of the present invention include systems and methods for transmitting media packets of data over a channel so as to reduce distortion at the receiving end of the transmission. One well-known cause of distortion is the burst loss of packets. That is, a number of sequential data packets are lost. The present invention, in one embodiment, provides a method and system with which to convert burst packet losses to effective isolated packet losses. The invention is based on the realization that bursty channel losses (losses of a number of sequential packets of data packets) generally produce larger total mean-square error distortion in streaming data than an equivalent number of isolated losses. A packet schedule-reordering or schedule adapting scheme, such as packet interleaving, for example, is proposed to combat the effect of bursty losses by converting them into isolated losses. A schedule adapter, such as an interleaver, for reducing the expected total distortion, subject to a delay constraint, can be selected using a model that predicts the expected distortion for different packet loss patterns.

For purposes of clarity and brevity, the discussion herein references an interleaver as the schedule adapter. However, it is appreciated that the present invention, in its various embodiments, can be used with other schedule adapters that are able to reorder a stream of data packets. Packet interleaving is readily implemented and does not consume additional bandwidth. The reordering of the transmission sequence of packets does not add any additional bits of data, and thus has no impact on the bandwidth. Additionally, interleaving can be used in conjunction with other techniques to improve media or other data quality, including Forward Error Correction (FEC) and error-resilient media coding techniques.

Figure 1:
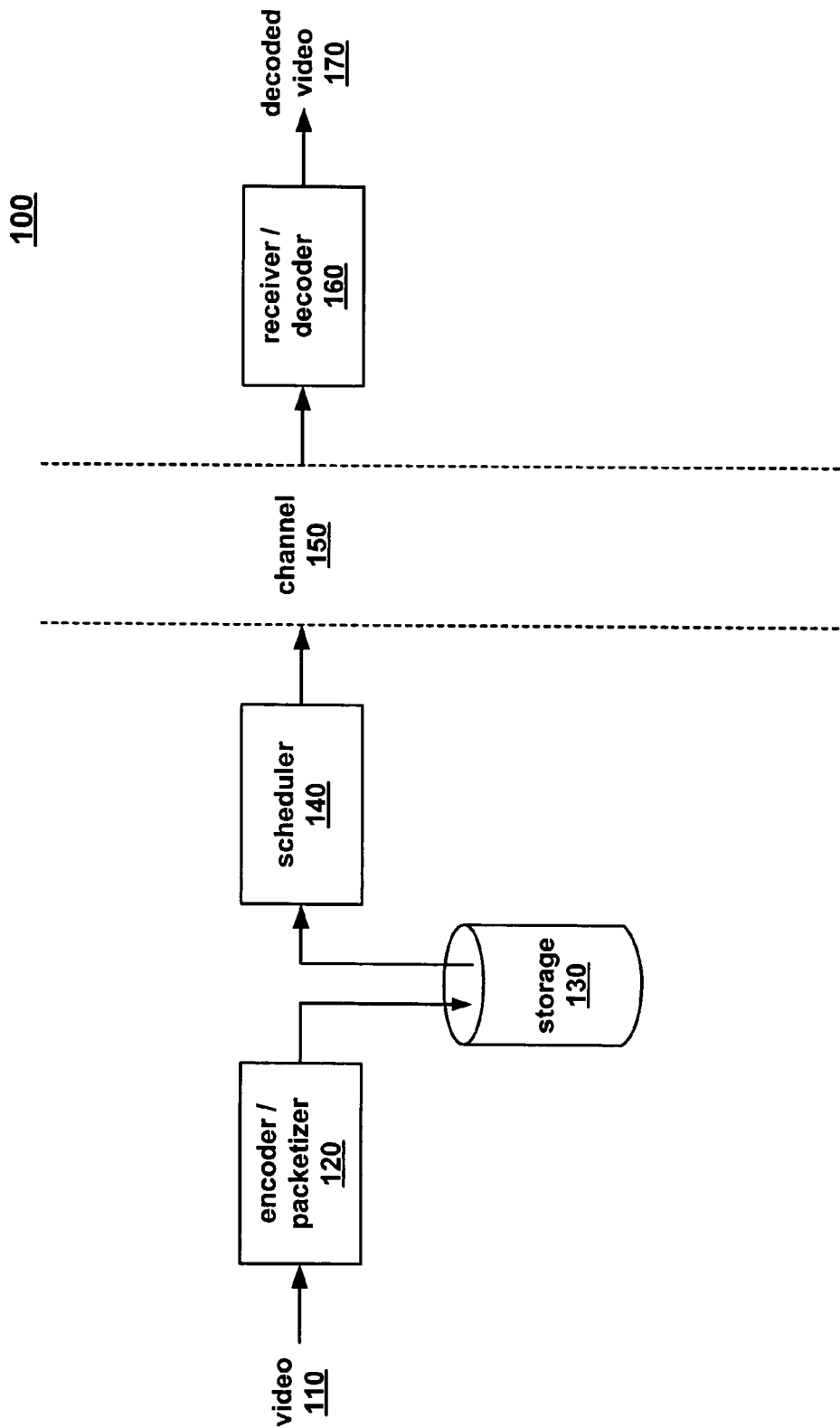
FIG. 1 is a block diagram showing an example of a typical system for transmitting media in accordance with conventional art.
Figure 3:
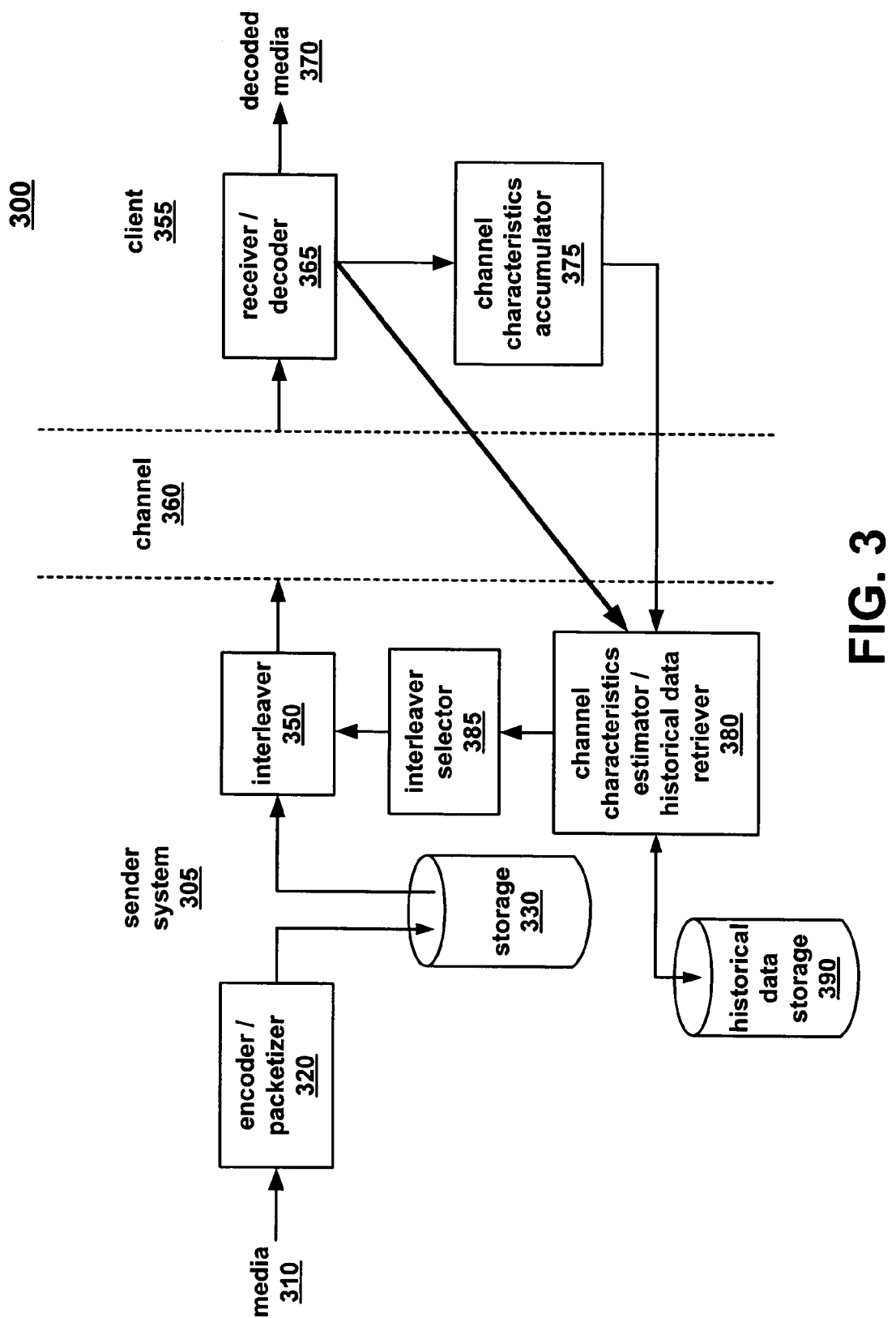
FIG. 3 is a block diagram of a system for converting burst losses in media transmission into isolated losses, according to one embodiment of the present invention.

FIG. 3 is a block diagram 300 of a system 305 for converting burst losses in video or other media transmission into effective isolated losses at the receiving end, according to one embodiment of the present invention. System 305 includes an encoder/packetizer 320 that receives an incoming media stream 310 and encodes and packetizes it, a storage media 330 for storing the encoded/packetized media data, interleaver 350, interleaver selector 385, channel characteristics estimator/historical data retriever 380 and historical data storage 390. It is appreciated that the blocks in system 305 are illustrated separately for clarity of illustration and discussion; however, these blocks may not exist as separate entities within system 305. It is also appreciated that the blocks of system 305 can be embodied in a single device or in a number of devices. In general, system 305 includes one or more devices that provide the functionality about to be described.

Furthermore, for purposes of clarity and brevity, the discussion herein is for video media data. However, it is appreciated that the present invention, in its various embodiments, can be used with other media data including, but not limited to, image-based data, speech, audio data, graphics data, Web page-based data; in general, any data which can be packetized.

In the embodiment of FIG. 3, sender system 305 sends information including video data to a client 355 over channel 360. Video data 310 is captured, encoded and packetized by encoder/packetizer 320. The packets are next stored in storage medium 330 for subsequent delivery.

Media data can be transmitted in response to a client request, or at a preset time for example. When it is time for the media to be transmitted, interleaver 350 adapts the conventional schedule (numerically sequential) into an adapted schedule. Interleaver 350 is a schedule adapter that, according to one embodiment, may be a hardware device well-known in the art, or it may, according to another embodiment, be a packet scheduler that consists of computer-readable code residing in a memory of sender system 305 and executed by a processor residing at interleaver 350. The packet scheduler can be programmed to perform as an interleaver and, as such, will be discussed herein as one embodiment of an interleaver. The adapted schedule is a function of the interleaver selected. The selection of the interleaver is performed by interleaver 350 based on characteristics of downstream channel 360 over which the video media packets are to be transmitted.

The video distortion that is sometimes visible to a receiver is often a result of a burst loss or a delay of video media due to congestion or interference in the transmission process. If several consecutive packets of data are lost (a "burst" loss) or delayed for a significant amount of time, it becomes difficult to accurately decode the video media at its destination. For example, with MPEG (Moving Picture Experts Group) encoding, a P-frame is predicted from a preceding P-frame or I-frame, and a B-frame is predicted from two preceding P-frames or a preceding I-frame and P-frame. Thus, the burst loss can make it more difficult to decode and reconstruct the video media at the recipient or client end.

In order to alleviate burst losses, the present invention includes a method for reordering the transmission of packets of media data using a reordering device such as interleaver 350. Interleaver 350 is a schedule adapter that may be selected from a collection of several types and/or configurations of interleavers. These interleavers include block, convolutional, switching or any type of interleaver that can be adaptable to a media streaming system, or, as discussed above, it can be a computer-readable code that schedules packets and that may be programmed to perform as an interleaver. Each interleaver has a different configuration and is selected based on characteristics of channel 360.

Figure 4A:
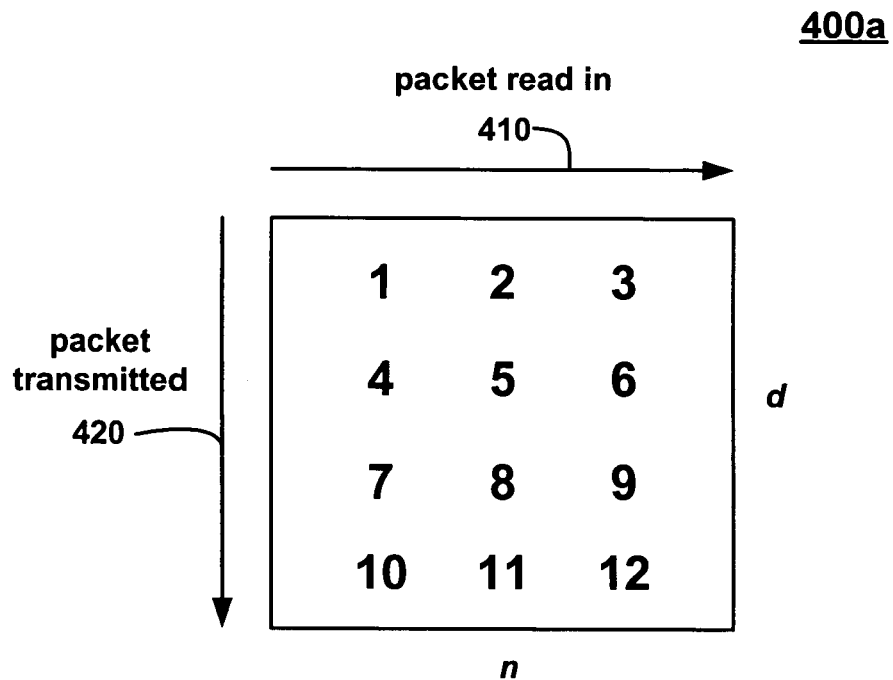
FIG. 4A is an illustration of a block interleaver, in accordance with one embodiment of the present invention.
Figure 5A:
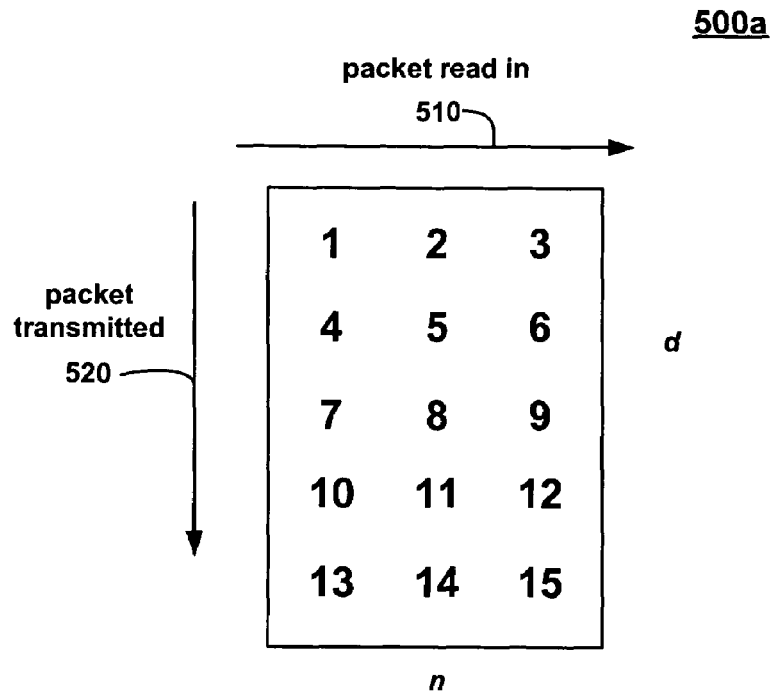
FIG. 5A is an illustration of a block interleaver, in accordance with one embodiment of the present invention.
Figure 8:
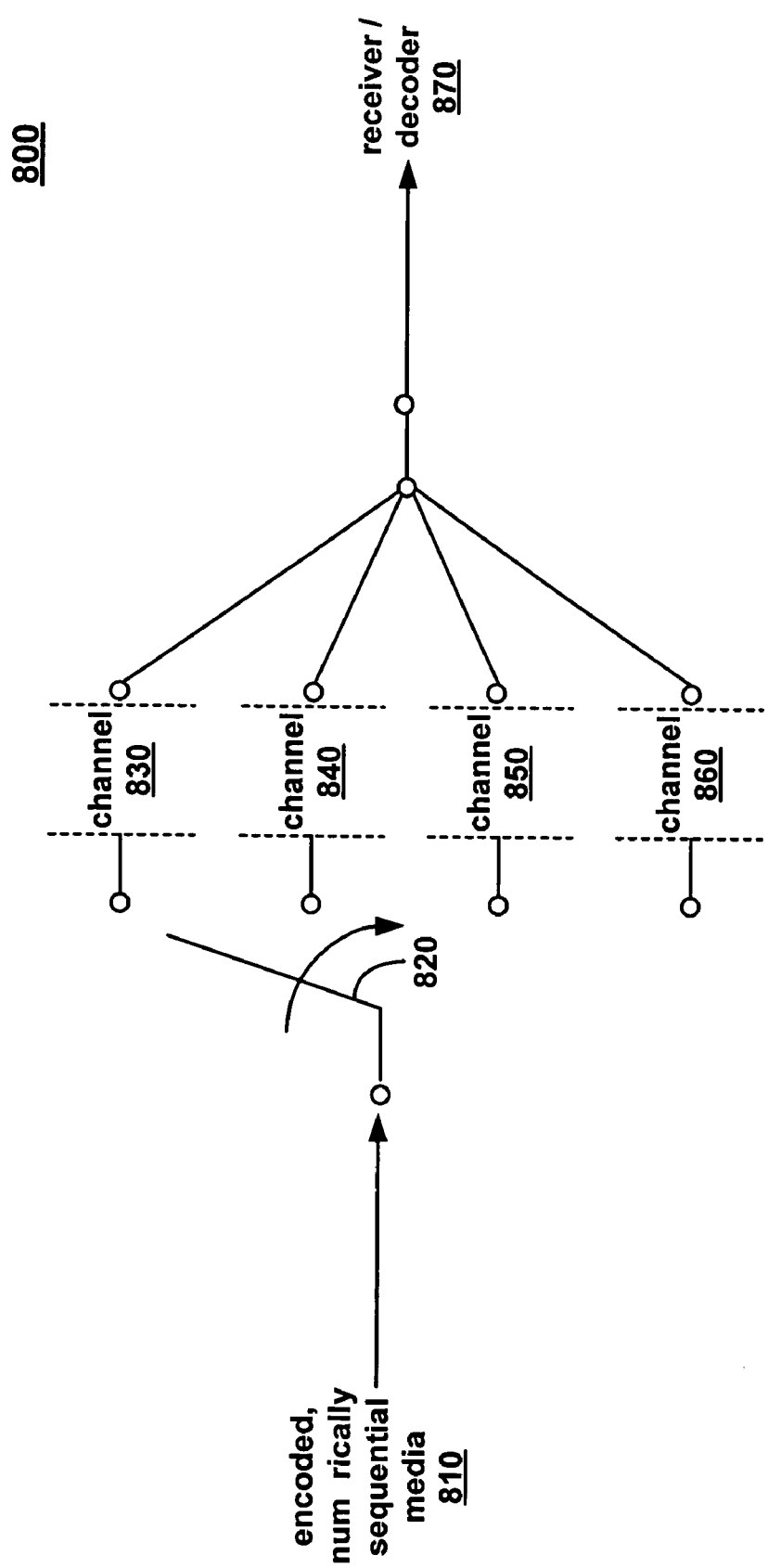
FIG. 8 illustrates a schedule adapter utilizing multiple channels, according to one embodiment of the present invention.

FIGS. 4A and 5A illustrate examples of two different configurations of block interleavers that can be used. In another embodiment of the present invention, a schedule adapter that can be used, similar in function to an interleaver, is a switching mechanism that switches alternatively among multiple channels in order to convert burst losses into isolated losses at the receiver end. FIG. 8 illustrates one embodiment of a multi-channel switching adapter.

Once the receiver/decoder 365 of FIG. 3 receives a transmission, it de-interleaves and decodes it and sends decoded media 370 on to client 355 for display. In one embodiment, receiver/decoder 365 also relays information about channel loss statistics to channel characteristics accumulator 375. Channel characteristics accumulator 375 can then accumulate the channel characteristics data and send the data back, on a predetermined periodic basis, to channel characteristics estimator/historical data retriever 380 at the sender's end.

Still referring to FIG. 3, the initial packets transmitted can be sent based on a standard or default schedule as determined by interleaver selector 385, or channel data retrieved from a historical data storage 390. Then as channel characteristics data becomes available from channel characteristics accumulator 375 at a receiver end of a transmission, interleaver selector 385 can select an interleaver 350 with a configuration that would better reduce distortions affiliated with channel 360 based on channel characteristics. The interleaver selector 385 can choose an available interleaver that will produce the lowest distortion of all of the available interleavers, or it can choose an interleaver that satisfies a predetermined distortion threshold. This selection can be performed on a scheduled basis from channel characteristics accumulator 375.

It is also possible that channel characteristics data, rather than being accumulated, can, according to one embodiment, be sent back on a per-packet basis. That is, as each packet is received and decoded, channel loss characteristics can be sent directly, in real time. This then allows real-time interleaver selection and reordering of transmission to accommodate the loss characteristics of channel 360 "on-the-fly".

The average burst length (average number of consecutive packets lost), the average time between losses and the estimated time between losses are example statistics for determining the channel loss characteristics. Channel loss characteristics can then be used for determining an order in which to transmit the packets of data. According to one embodiment, the channel loss data includes an average packet loss rate and the number of times different loss events occur. For example, it includes the number of times an isolated packet loss occurred, the number of times sequential losses of packets occurred, the number of bursts of length 2 packets, the number of bursts of length 3 packets, the number of bursts of length 4 packets, etc., the pattern of the packets received and lost, the end-to-end delay in receipt of packets and the time between losses.

In one embodiment, the receiver/decoder 365 sends information regarding which packets were received and which were lost to the channel characteristics accumulator 375. The sender's characteristics estimator/historical data retriever 380, upon receipt of the data from the client's channel characteristics accumulator 375, can then determine the pertinent statistics from the information received. The information can then be stored in historical data storage media 390 for future retrieval.

In another embodiment, distortion can be simulated for varying combinations of channel losses and interleavers. For example, burst losses of 3 packets could be simulated with a (3,4) interleaver, a (3,5) interleaver, a 4,3) interleaver, etc. and the results queried for the combination that produced the least distortion for a 3-packet loss. Likewise, the same information could be collected for burst losses of 2 packets, 4 packets, 5 packets, etc., for all available interleavers. From this information, a table containing the results can be generated and stored. This table can then be used for predicting the minimum distortion in media received for given channel losses and a given interleaver. Thus, the selection of an interleaver by interleaver selector 385 could be a matter of consulting the table. Another variable that could be considered in the distortion prediction is the order of the frames being transmitted in each packet and from packet to packet.

There may be times in which there is no feedback of channel characteristics, such as when the media is broadcast to many clients. In such instances, historical data for given channels can be relied upon for estimating the packet transmission order.

Once characteristics estimator/historical data retriever 380 identifies the channel characteristics between the sender system 305 and the client 355, it examines the various eligible interleavers 350 and determines the one that will provide minimum expected total distortion as seen by the client 355 for the channel being used while satisfying any delay constraints that might exist. In other words, the size of a block interleaver might cause an unacceptable delay in transmission if it is too large.

Another possible consideration in the selection of the interleaver is the original order of the encoded media packets in terms of number of P-frames and/or B-frames between I-frames as in MPEG encoding. It may not be desirous to reorder the transmission so that, for example, all I-frames were sent consecutively. If this were the case, a burst loss of several I-frames could increase the distortion. For example, if the packets are coded in a periodic manner, such as IPPPIP-PPIPPP, then isolated losses of every fourth frame would result in loss of all I-frames. In this instance, it may be preferable to have all the losses together as in a burst loss. Therefore, it is desirous to transmit the packets in an order that would preserve as many I-frames as possible, thus resulting in reduced distortion.

An important point is that the choice of schedule adapting strategy depends on the specific media coding mode per frame (e.g., MPEG I, P, B), the channel conditions, delay constraint (if necessary), and the specific media content. For example, for a given IPB coding pattern, channel conditions and delay, the choice of interleaver will still vary depending on whether the media content is largely static (e.g., mediaconference) or highly dynamic (e.g., basketball game). This is because the same packet loss pattern will produce different resulting distortions for different media sequences. Therefore, appropriate models that can accurately predict the resulting distortion for a given media sequence and different packet loss patterns should be used to select the best interleaver. Models for accurately predicting the distortion for a given media sequence and a given packet loss pattern are known in the art. Such models can be used to estimate the distortion for different packet loss patterns that may result from the use of different possible interleavers. The interleaver that achieves the lowest expected distortion and, thus, the highest expected quality, can be chosen as the preferred interleaver to use for a given channel and a given media.

Specifically, given knowledge of the encoded media packet order, channel conditions and a delay constraint (e.g., 400 ms) the sender 305 determines which of the possible interleavers 350 would be expected to produce the least expected distortion in decoded media 370 at the client 355. This may be a single selection of an interleaver 350 for a given transmission when channel 360 exhibits stable characteristics, or it may require dynamic changing of interleaver 350 based on realtime feedback from the recipient client device 365 regarding the loss characteristics of channel 360.

There are situations in which characteristics of channel 360 vary as a function of time. For example, as the congestion increases, packet loss rates can increase. Also, for a wireless link, as the distance between sender 305 and client 355 increases, the received signal-to-noise ratio (SNR) decreases. Another example of variation with time might be that, as more wireless transmitters try to use the same bandwidth, additional interference occurs (again, the SNR goes down).

In one embodiment of the present invention, receiver/decoder 365 can gather the applicable statistics and send them back via channel characteristics accumulator 375 to sender's channel characteristics estimator/historical data retriever 380. Channel characteristics estimator/historical data retriever 380 can then reassess the appropriate interleaver and perhaps select a different one. A different interleaver would alter the schedule for transmitting packets in order to improve the quality of decoded media 370 received by client 355.

FIG. 4A is an illustration of a block interleaver 400a, in accordance with one embodiment of the present invention. Block interleaver 400a is one example of an interleaver configuration that can be used at a sender (e.g., interleaver 350 at sender 305 of FIG. 3) to interleave packets of media data before transmission. Numerically sequential packets are first read into the interleaver in horizontal rows as shown by arrow 410, with each row accommodating n packets. Packets are transmitted in columns as indicated by arrow 420 as soon as d rows of packets are filled. Here n is referred to as the block size and d is the interleaving depth of interleaver 400a. An interleaver can be identified by (n,d), so that interleaver 400a is a (3,4) interleaver.

Figure 4B:
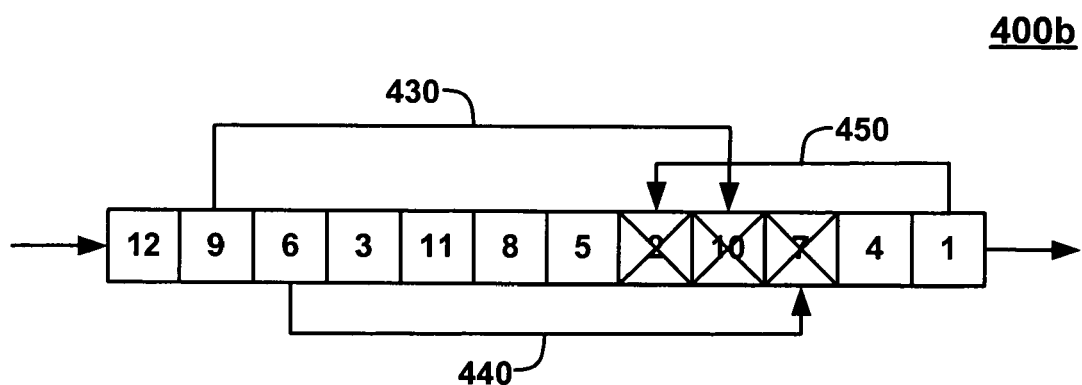
FIG. 4B is an illustration of the effect of a burst loss in a media transmission utilizing a block interleaver, in accordance with one embodiment of the present invention.

FIG. 4B illustrates a stream of media packets, as transmitted from interleaver 400a, having a burst loss of three packets, 7, 10 and 2. For purposes of discussion it is assumed that a packet contains a frame of media, although in practice this may not be the case. Once these packets arrive at their destination receiver and are de-interleaved and decoded, the frame contained in packet 1 can be used to predict the lost frame from packet 2 as indicated by arrow 450. Likewise, frame 6 is available to predict frame 7, shown by arrow 440 and frame 9 can predict frame 10, shown by arrow 430. Thus the burst loss of three packets is converted to three separate and isolated losses by use of interleaver 400a. Since the burst loss now affects separated packets instead of successive packets, the distortion can be expected to be lower, resulting in a higher quality transmission. A (3,4) interleaver can turn burst losses of up to four packets into effective isolated losses with respect to the original (pre-interleaved) order.

The effectiveness of an interleaver depends on the block size n, the interleaving depth d, and the characteristics of the channel over which the packets are transmitted. A larger interleaver is more effective in that it can convert a longer burst loss into isolated losses or increase the separation of the converted isolated losses. However, this is at the cost of higher latency. At the client, an interleaved packet received cannot be used until all the packets it depends on are received. Therefore, a trade-off exists between the effectiveness in permuting the packets and the latency. This tradeoff may, according to one embodiment of the present invention, be considered in selecting an appropriate interleaver for adapting the schedule of packets to be transmitted over a given channel.

Another important consideration in the selection of an appropriate interleaver is the sequence of frames in the stream of packets to be reordered. For example, if a stream of packets, each containing a frame, was of a sequence in which every $5^{th}$ packet contained an I-frame, it would not be desirable to use an interleaver in which n is five. An interleaver such as a (5,4) interleaver would, in such a case, transmit four I-frames sequentially. Thus, a burst loss that might occur could have the potential of losing up to four consecutive I-frames. Such a loss could result in increased distortion. Therefore, the sequence of frames in the incoming media stream is an important consideration in the selection of an interleaver or other device with which to reorder the sequence of media packet transmission.

FIG. 5A is an illustration of a (3,5) block interleaver 500a that may be selectable by interleaver selector 385 if FIG. 3, in accordance with one embodiment of the present invention. Interleaver 500a has a block size of three packets and an interleaver depth of five. Thus, in this example, media packets 1-15 are read in horizontally into rows of three packets and then read out vertically in columns of five.

Figure 5B:
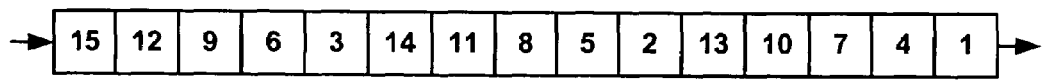
FIG. 5B is an illustration of media transmission utilizing a block interleaver, in accordance with one embodiment of the present invention.

FIG. 5B illustrates a stream of media packets as scheduled by block interleaver 500a having (n,d) of (3,5) as is illustrated in FIG. 5A, in accordance with one embodiment of the present invention. It can be seen that a burst loss of up to five packets can be changed to effective isolated losses by the (3,5) interleaver, but there is a longer delay time for reading in fifteen packets into interleaver 500a than to read in twelve packets into interleaver 400a of FIG. 4A. Thus, there becomes a trade-off decision to be factored into the selection of an interleaver to accommodate channel characteristics. If a given channel rarely sees a burst loss greater than three packets in length, (3,4) interleaver 400a would be appropriate, but if losses of five packets in length are common, interleaver 500a might be preferred. However, there are other considerations as enumerated in the foregoing discussion in conjunction with FIGS. 4A and 4B.

System for Live Video

Figure 6:
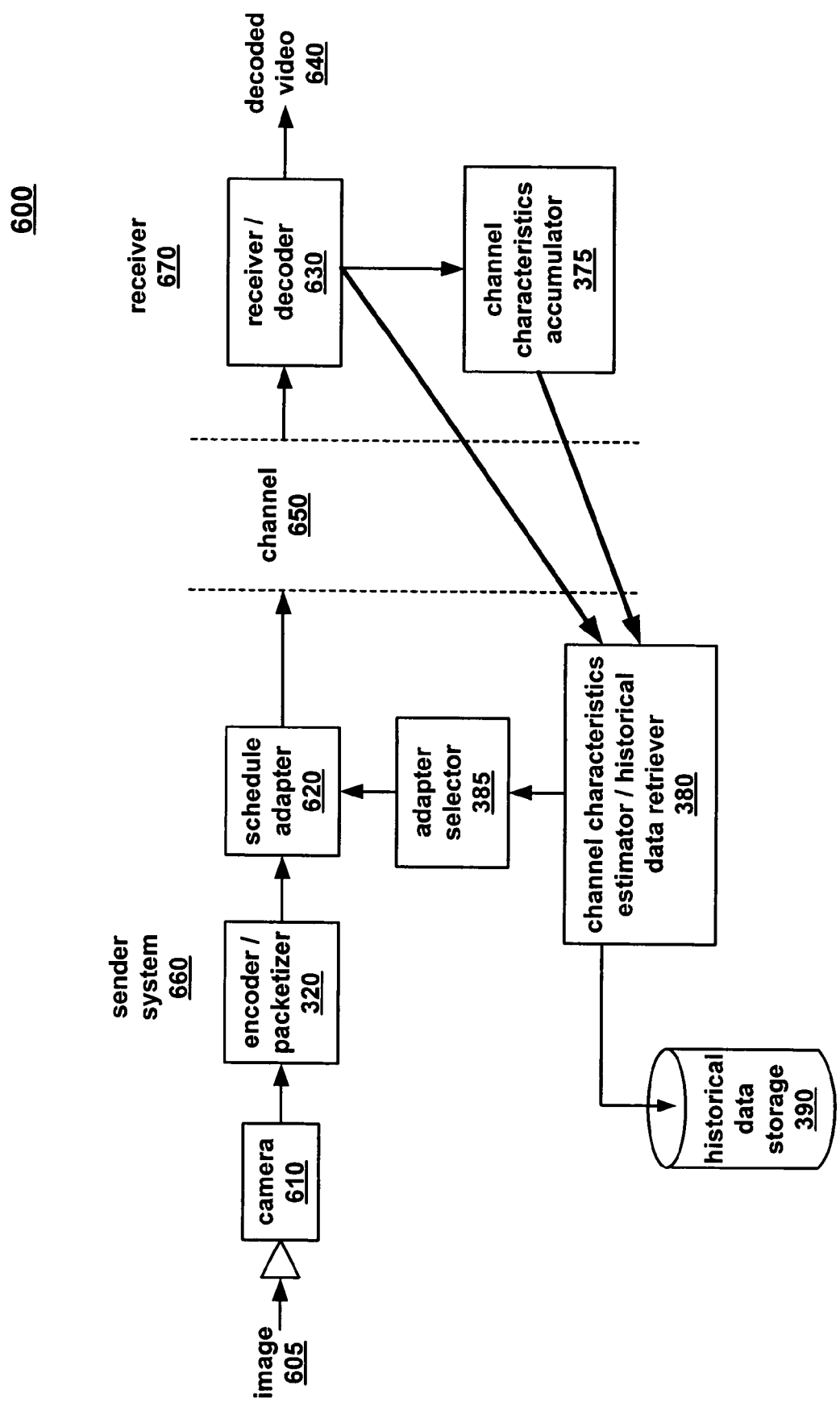
FIG. 6 is a block diagram of a system for transmitting live media data for real-time transmission, according to one embodiment of the present invention.

FIG. 6 is a block diagram 600 of sender system 670 for transmitting live video data for real-time transmission, according to one embodiment of the present invention. Here a camera 610 records an image 605 and the recorded video is fed into encoder/packetizer 320 for encoding and packetizing in preparation for transmission over channel 650.

Schedule adapter 620 then adapts the order of the packets based on information it has regarding channel characteristics. Schedule adapter 620 can be a collection of several configurations of interleavers, each with a different configuration, selectable based on characteristics of channel 650.

FIGS. 4A and 5A illustrate examples of two different configurations of block interleavers that can be used. In another embodiment of the present invention, schedule adapter 620 is a switching mechanism that switches alternatively among multiple channels in order to convert burst losses into isolated losses at the receiver end. FIG. 8 illustrates such a multi-channel switching adapter.

Still referring to FIG. 6, the initial packets transmitted can be sent based on a standard or default schedule as determined by adapter selector 385, or channel data retrieved from a historical data storage 390. Then as channel characteristics data becomes available from channel characteristics accumulator 375 at a receiver end of a transmission, adapter selector 385 may select a schedule adapter 620 with a configuration that would better reduce distortions affiliated with channel 650 based on channel characteristics. This selection can be performed dynamically as channel loss data is sent from recipient device 630, or on a scheduled basis from channel characteristics accumulator 375.

Once the receiver/decoder 630 receives a transmission, it de-interleaves it, decodes it and sends decoded media 640 on to a client for display. In one embodiment, receiver/decoder 630 sends channel loss information, on a packet-by-packet basis, back to channel characteristics estimator/historical data retriever 380. In one embodiment, receiver/decoder 630 also relays information about channel loss statistics to channel characteristics accumulator 375. The channel characteristics accumulator 375 can then send the information back to the sender's channel characteristics estimator/historical data retriever 380 at the sender's end. According to one embodiment, the information accumulated may include an average packet loss rate, the number of times different loss events occur, and the average time between loss events. For example, it may include the number of times an isolated loss occurred, the number of bursts of length 2 packets, the number of bursts of length 3 packets, the number of bursts of length 4 packets, etc., as well as the time between losses and the end-to-end delay time.

In another embodiment, the receiver/decoder 630 sends information regarding which packets were received and which were lost to the channel characteristics accumulator 375. The sender's characteristics estimator/historical data retriever 380, upon receipt of the data from the client's channel characteristics accumulator 375, can then determine the pertinent statistics from the information received. The information can then be stored in historical data storage media 390 for future retrieval.

Once characteristics estimator/historical data retriever 380 identifies the channel characteristics between a sender and a client, it examines the various eligible schedule adapters 620 and determines the one that will provide minimum expected total distortion as seen by the client for the channel being used, while satisfying any delay constraint (if a delay constraint exists). Specifically, given knowledge of the channel conditions and a delay constraint (e.g., 400 ms) the sender determines which of the possible schedule adapters 620 would produce the least expected distortion in decoded media 640 at the client.

Mid-Network Re-Scheduling

Figure 7:
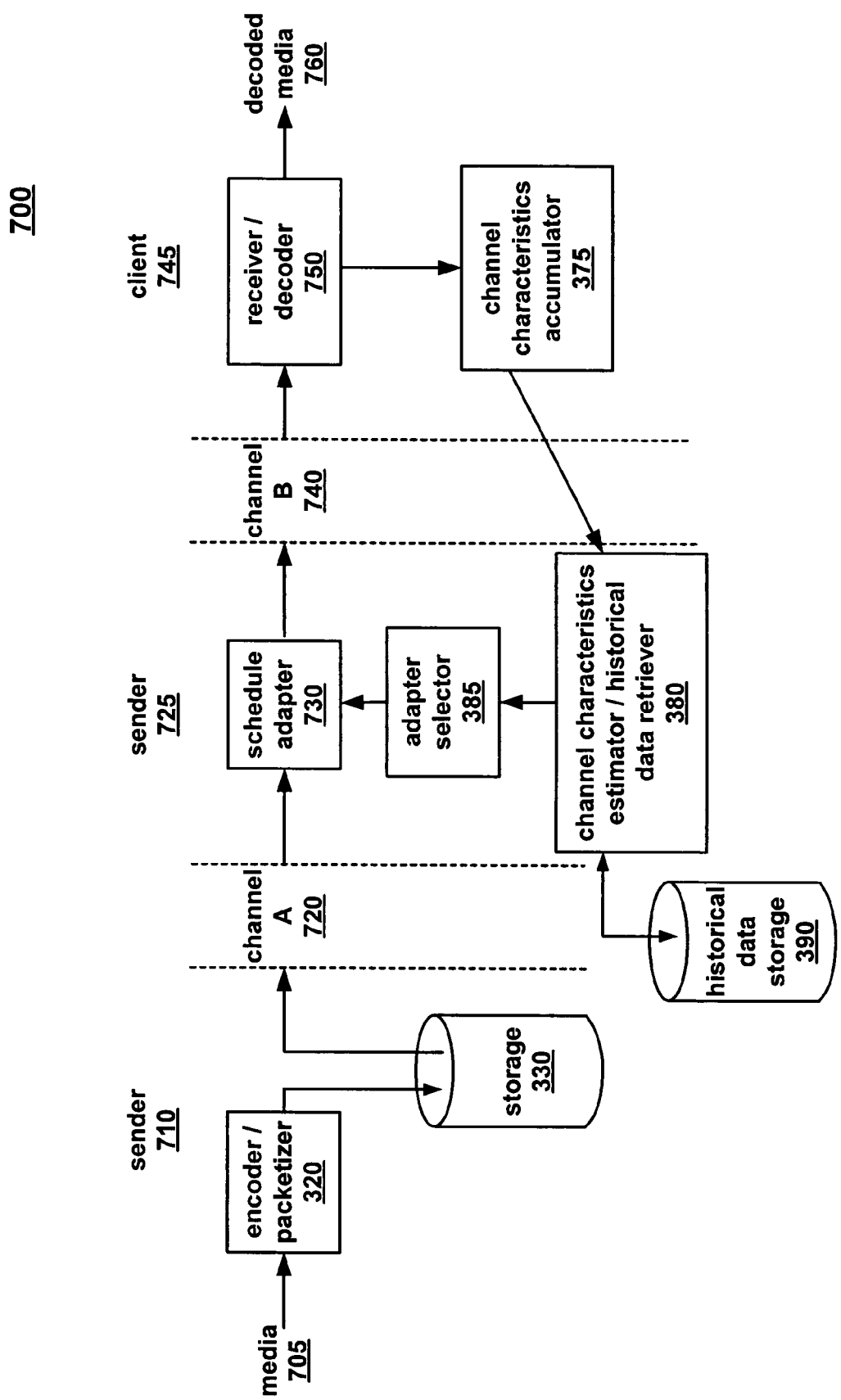
FIG. 7 is a block diagram of a system for adapting the scheduling of media packets received from one channel and transmitting them according to the adapted schedule over another channel, in accordance with one embodiment of the present invention.

FIG. 7 is a block diagram of a system for adapting the scheduling of media packets received from one channel and transmitting them according to the adapted schedule over another channel, in accordance with one embodiment of the present invention. In the present embodiment, a sender 710 transmits a media stream 705 in a conventional manner, in that the media 705 is encoded and packetized at encoder/packetizer at some point 320 and stored in storage media 330. At an appropriate time for transmission, media packets are transmitted across channel A 720 in a numerically sequential stream. In another embodiment, the sender may be performing real-time capturing, encoding and streaming.

Sender 725 receives the media data and adapts the scheduling with schedule adapter 730 to reduce distortion across channel B 740 based on estimated channel characteristics of channel B 740. Schedule adapter 730 may be a collection of several configurations of interleavers, each with a different configuration, selectable based on characteristics of channel 740. FIGS. 4A and 5A illustrate examples of two different configurations of block interleavers that can be used. In another embodiment of the present invention, schedule adapter 730 may be a switching mechanism that switches alternatively among multiple channels in order to convert burst losses into isolated losses at the receiver end. FIG. 8 illustrates such a multi-channel switching adapter Once receiver/decoder 750 of FIG. 7 receives a transmission, it can de-interleave and decode it, and send decoded media 760 on to client 745 for display. In one embodiment, receiver/decoder 750 also relays information about channel loss statistics to channel characteristics accumulator 375. The channel characteristics accumulator 375 can then send the information back to the channel characteristics estimator/historical data retriever 380 at the sender 725. According to one embodiment, the information accumulated can include an average packet loss rate and the number of times different loss events occur. For example, it may include the number of times an isolated loss occurred, the number of bursts of length 2 packets, the number of bursts of length 3 packets, the number of bursts of length 4 packets, etc, the time each packet is received and the end-to-end delay times for each packet.

In another embodiment, the receiver/decoder 750 can send information regarding which packets were received and which were lost to the channel characteristics accumulator 375. The characteristics estimator/historical data retriever 380, upon receipt of the data from the client's channel characteristics accumulator 375, can then determine the pertinent statistics from the information received. The information can then be stored in historical data storage media 390 for future retrieval. The data can also be used dynamically, on a real time basis, for adjusting the selected schedule adapter in order to reorder the transmission sequence of media packets to that which will reduce distortion that might be associated with downstream channel 740.

Once the characteristics estimator/historical data retriever 380 of sender 725 identifies the channel characteristics between a sender and a client, it examines the various eligible schedule adapters 730 and determines the one that will provide minimum expected total distortion as seen by the client for the channel being used, while satisfying any delay constraint (if a delay constraint exists). Specifically, given knowledge of the channel conditions and a delay constraint (e.g., 400 ms) the sender determines which of the possible schedule adapters 730 would produce the least expected distortion in decoded media 760 at the client.

Mid-Network Re-Scheduling of Scheduled Streaming

In an alternative embodiment, sender 710 in FIG. 7 may already be performing appropriate scheduling for channel A. For example, sender 710 may be operating as described by sender system 305 in FIG. 3 or sender system 660 in FIG. 6. In this case, the mid-network sender 725 can reschedule the already scheduled packet transmission to further reduce any distortion produced in the two channels. For example, sender 710, operating alone, would have to select a schedule that would best reduce the distortion for the end-to-end channel corresponding to the concatenation of channels 720 and 740. However, by placing the mid-network re-scheduler in between, sender 710 only needs to be concerned with the distortion reduction associated with channel 720 and re-scheduler 725 can then select the interleaver that best reduces the distortion associated with channel 740. Specifically, sender 710 controls the scheduling for channel 720 and sender 725 re-schedules as needed to a preferred schedule for channel 740. This can lead to improved performance since each channel is considered separately for improving distortion due to packet losses (as opposed to concatenated losses) and can provide lower end-to-end delay times.

Scheduling Across Multiple Channels

FIG. 8 illustrates a schedule adapter 800 utilizing multiple channels, according to one embodiment of the present invention. Schedule adapter 800 has available to it four different channels 830, 840, 850 and 860 according to the present embodiment. In another embodiment there can be three, five, six, or any number of channels that might be made available to schedule adapter 800.

Wherein an interleaver, such as interleaver 400a in FIG. 4A, changes the order with respect to time in which packets are sent out over a single channel, schedule adapter 800 receives numerically sequential packets 810 from a conventional encoder/packetizer (e.g., encoder/packetizer 320 of FIG. 3) and forwards them in the same order with respect to time, but over different channels by way of switching mechanism 820. For example, channel 830 may receive packet 1, channel 840, packet 2, channel 850, packet 3, channel 860, packet 4, then, 830 may next receive packet 5, etc. The result would be a media stream that would look like that of (3,4) interleaver 400a of FIG. 4A in accordance with one embodiment.

Still referring to FIG. 8, the packets would potentially be received at receiver/decoder 870 in the same numerically sequential order as that in which they were originally scheduled. In another embodiment, receiver/decoder 870 is downstream of a switch similar to switch 820 that can mirror the movement of switch 820 for receiving the packets in the channel order in which they were sent. Receiver/decoder 870 can then be programmed to check the order and re-sequence any out-of-sequence packets that may have been delayed due to some unforeseen characteristics of the channel over which they were streamed.

Consider that changing the order of a stream of packets using an interleaver such as interleaver 350 of FIG. 3 might be thought of as re-scheduling "over time", and changing the order using multiple channels as illustrated in FIG. 8 might be thought of as re-scheduling "over space". Although each has been treated as a separate embodiment, now consider an embodiment in which the packets are scheduled across both time and space. In one embodiment, this may be accomplished through concatenation of an interleaver and multiple channels. Such a process would result in a more random sequence of packets that could further reduce distortion resulting from packet loss, thus improving performance.

In yet another embodiment the scheduling of packets across both space and time may be accomplished as an integrated process in which the packets are scheduled randomly across multiple channels. In this embodiment, the randomizing of the packet order could be even further improved and, resultantly, so could channel performance be further improved.

Figure 9:
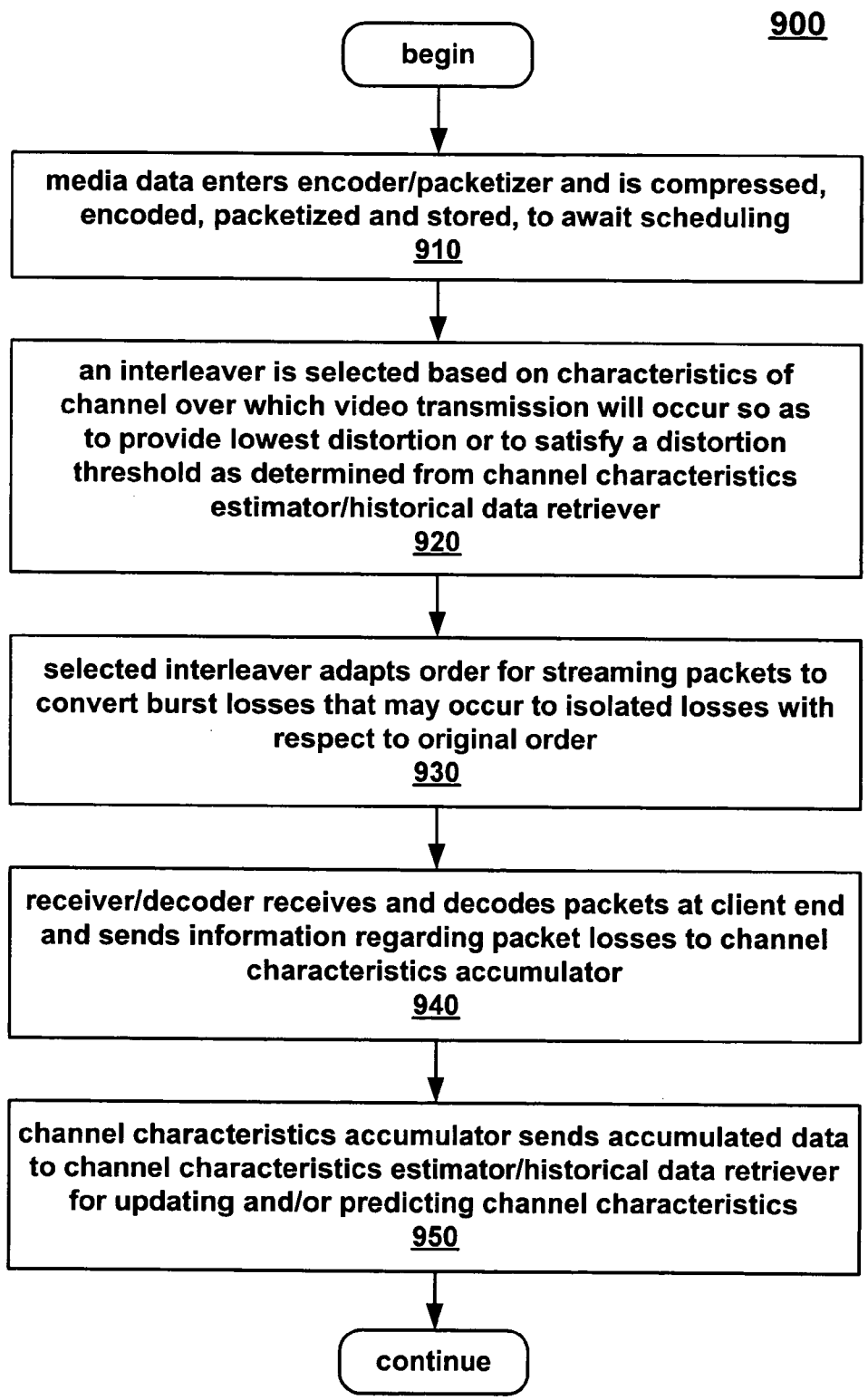
FIG. 9 is a flow chart of a method for converting burst losses into isolated losses, in accordance with one embodiment of the present invention.

FIG. 9 is a flowchart of a method 900 for converting burst losses into isolated losses, in accordance with one embodiment of the present invention. Although specific steps are disclosed in flowchart 900, such steps are exemplary. That is, embodiments of the present invention are well suited to performing various other steps or variations of the steps recited in flowchart 900. All of, or a portion of, the methods described by flowchart 900 can be implemented using computer-readable and computer-executable instructions which reside, for example, in computer-usable media of one or more computer systems. Generally, flowchart 900 can be implemented by system 300 of FIG. 3.

In step 910, in the present embodiment, media data enters an encoder/packetizer (e.g., encoder/packetizer 320 of FIG. 3) where it is compressed, encoded and packetized for future transmission. It can then be further processed according to the following steps, or stored in a storage area to await scheduling and transmission when requested from a client device.

In step 920 of method 900, in accordance with one embodiment of the present invention, an interleaver is selected by an interleaver selector. The interleaver can be a collection of several configurations of interleavers, each with a different configuration, selectable based on characteristics of the channel over which transmission will occur. The interleaver selector selects an interleaver from those available that will provide the lowest amount of distortion or that will satisfy a predetermined distortion threshold. FIGS. 4A and 5A illustrate examples of two different configurations of block interleavers that can be used. In another embodiment of the present invention, other configurations and/or types of interleavers, (e.g., convolutional) or schedule adapters can be used. One example of a schedule adapter that can be used, similar in function to an interleaver, is a switching mechanism that switches alternatively among multiple channels in order to convert burst losses into effective isolated losses at the receiver end. FIG. 8 illustrates such a multi-channel switching adapter.

In step 930, the selected interleaver then adapts the conventional schedule (numerically sequential) into an adapted or reordered schedule based on characteristics of the channel over which the media is to be transmitted. The adapted schedule is selected to convert burst losses that might occur into isolated losses as received, so as to reduce distortion in the media at a receiver end. The channel characteristics can be determined by a channel characteristics estimator/historical data retriever based on channel data received from the receiver end.

In step 940 of FIG. 9, a receiver/decoder receives, de-interleaves and decodes the media packets, sends the data to the client and sends information regarding packet losses to a channel characteristics accumulator and/or back to the sender system on a real-time basis in accordance with one embodiment. The channel characteristics accumulator can then send the information back to the sender's channel characteristics estimator/historical data retriever at the sender's end.

According to one embodiment, the information accumulated may include an average packet loss rate, the number of times different loss events occur, and the average time between loss events. For example, it may include the number of times an isolated loss occurred, the number of bursts of length 2 packets, the number of bursts of length 3 packets, the number of bursts of length 4 packets, etc., the end-to-end delay of each packet and the time between losses. In another embodiment, the channel characteristics accumulator may accumulate information regarding which packets were received and which were lost.

In step 950, the channel characteristics accumulator sends the accumulated information to the sender's characteristics estimator/historical data retriever, according to one embodiment. Upon receipt of the channel characteristics data, the sender's characteristics estimator/historical data retriever determines the pertinent statistics from the information received. The information can then be stored in a historical data storage media for future retrieval. The process continues until all data has been transmitted at which time method 900 is exited.

In summary, in its various embodiments, the present invention provides methods and systems thereof for reducing distortion and improving the quality of media received by determining and implementing a strategy for reordering the transmission across media data packets in order to reduce the effects of media packet losses. The features of the present invention are well suited for, but not limited to, media transmission over channels with significant losses of sequential packets (burst losses). According to the various embodiments of the present invention, the quality of media data received can be significantly improved by isolating packets lost so that they can be predicted by a packet that was recorded relatively close in time to the lost packet.

Embodiments of the present invention are thus described. While the present invention has been described in particular embodiments, it should be appreciated that the present invention should not be construed as limited by such embodiments, but rather construed according to the following claims.

What is claimed is:

1. A method for transmitting media packets, comprising:
   receiving media packets in a first order;
   selecting a schedule adapter from a plurality of selectable schedule adapters for reordering said media packets into a second order, wherein said second order is selected according to loss characteristics of a downstream channel, and wherein said second order results in reduced distortion with respect to a predicted distortion from said first order; and
   transmitting said media packets in said second order.

2. The method of claim 1 wherein media packet losses resulting from said second order is in a pattern of isolated losses.

3. The method of claim 1 further comprising storing said media packets in said first order prior to said transmitting.

4. The method of claim 1 further comprising determining said second order by said schedule adapter.

5. The system as described in claim 1 wherein said schedule adapter is an interleaver.

6. The system as described in claim 1 wherein said schedule adapter is a packet scheduler, said packet scheduler being computer-readable code, said code programmable to perform as an interleaver.

7. The method of claim 1 further comprising:
   predicting for each of said plurality of selectable schedule adapters a corresponding amount of distortion; and
   selecting one of said plurality of selectable schedule adapters according to said predicted distortion.

8. The method of claim 1 further comprising estimating said loss characteristics from channel characteristics data received from a downstream device.

9. The method of claim 8 wherein said downstream device sends, in real-time, said channel characteristics data corresponding to each packet received, back to a sender system.

10. The method of claim 8 wherein said downstream device accumulates said channel characteristics data for sending at a predetermined interval.

11. The method of claim 8 wherein said loss characteristics are selected from a group consisting essentially of:
   time between losses;
   number of isolated packet losses;
   number of sequential packet losses;
   end-to-end delay for each packet;
   number of said media packets lost in each of said sequential packet losses;
   packets received/lost pattern; and
   time of receipt of each packet.

12. The method of claim 11 further comprising predicting distortion produced from various of said loss characteristics in combination with various schedule adapter configurations and storing said predicted distortion results as basis for future selecting of said second order for minimizing said distortion.

13. The method of claim 1 wherein said selecting said schedule adapter is by an interleaver selector.

14. The method of claim 1 wherein said selecting said schedule adapter is by a switch and wherein said switch transmits said media packets alternately among a plurality of downstream channels.

15. A schedule adapter for receiving media packets in a first order and for reordering and transmitting said media packets in a second order wherein said schedule adapter is selected from a plurality of schedule adapters to reduce distortion with respect to said first order based on estimated channel characteristics and wherein for each of said plurality of selectable schedule adapters, a corresponding amount of distortion is predicted and one of said plurality of selectable schedule adapters is selected according to a predicted distortion based on said estimated channel characteristics.

16. The schedule adapter as described in claim 15 wherein said media packets are stored prior to transmitting.

17. The schedule adapter as described in claim 15 wherein said second order is determined by an interleaver.

18. The schedule adapter as described in claim 15 wherein said second order is determined by a packet scheduler, said packet scheduler being computer-readable code, said code programmable to perform as an interleaver.

19. The schedule adapter as described in claim 15 wherein said channel characteristics are estimated from channel characteristics data received from a downstream device.

20. The schedule adapter as described in claim 19 wherein said downstream device sends, in real-time, said channel characteristics data corresponding to each packet received, back to said system.

21. The schedule adapter as described in claim 19 wherein said downstream device accumulates said channel characteristics data for sending at a predetermined interval.

22. The schedule adapter of claim 15 wherein said second order is selected by an interleaver selector.

23. The schedule adapter of claim 15 wherein said second order is selected by a switch and wherein said switch transmits said media packets alternately among a plurality of downstream channels.

24. The schedule adapter of claim 15 wherein distortion produced from various of said loss characteristics in combination with various interleaver configurations is predicted and said predicted distortion results are stored as basis for future selecting of said second order for minimizing said distortion.

25. A computer-usable medium having computer-readable code embodied therein for causing a computer system to perform a method of converting burst losses of media packets in a second order into isolated losses in relation to a first order of media packets in a media transmission, comprising:
   receiving encoded media packets in said first order;
   selecting a schedule adapter from a plurality of schedule adapters for reordering said media packets into said second order that is selected according to loss characteristics of a downstream channel; and
   transmitting said media packets in said second order.

26. The computer-usable medium as described in claim 25 wherein said media packets are stored prior to transmitting.

27. The computer-usable medium as described in claim 25 wherein said second order is determined by said schedule adapter.

28. The computer-usable medium as described in claim 25 wherein said schedule adapter is an interleaver.

29. The computer-usable medium as described in claim 25 wherein said schedule adapter is a packet scheduler, said packet scheduler being computer-readable code, said code programmable to perform as an interleaver.

30. The computer-usable medium of claim 25 wherein, for each of said plurality of selectable schedule adapters, a corresponding amount of distortion is predicted and one of said plurality of selectable schedule adapters is selected according to said predicted distortion.

31. The computer-usable medium as described in claim 25 wherein said loss characteristics are estimated from channel characteristics data received from a downstream device.

32. The computer-usable medium as described in claim 31 wherein said downstream device sends, in real-time, said channel characteristics data corresponding to each packet received, back to said system.

33. The computer-usable medium as described in claim 31 wherein said downstream device accumulates said channel characteristics data for sending at a predetermined interval.

34. The computer-usable medium as described in claim 31 wherein said loss characteristics are chosen from a group consisting essentially of:
   time between losses;
   number of isolated packet losses;
   number of sequential packet losses;
   end-to-end delay for each packet;
   number of said media packets lost in each of said sequential packet losses;
   packets received/lost pattern; and
   time of receipt of each packet.

35. The computer-usable medium of claim 34 wherein distortion produced from various of said loss characteristics in combination with various interleaver configurations is predicted and said predicted distortion results are stored as basis for future selecting of said second order for minimizing said distortion.

36. The computer-usable medium of claim 25 wherein said schedule adapter is selected by an interleaver selector.

37. The computer-usable medium of claim 25 wherein said schedule adapter is selected by a switch and wherein said switch transmits said media packets alternately among a plurality of downstream channels.

* * * * *